(12) United States Patent
Matsushita (10) Patent No.: US 11,841,902 B2
(45) Date of Patent: Dec. 12, 2023

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Masahiro Matsushita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 17/410,830

(22) Filed: Aug. 24, 2021

(65) Prior Publication Data

US 2022/0075821 A1  Mar. 10, 2022

(30) Foreign Application Priority Data

Sep. 4, 2020  (JP) .................................. 2020-149008

(51) Int. Cl.
*G06F 16/78* (2019.01)
*G06V 20/40* (2022.01)
*G06F 18/22* (2023.01)
*G06V 20/52* (2022.01)

(52) U.S. Cl.
CPC .......... *G06F 16/7867* (2019.01); *G06F 18/22* (2023.01); *G06V 20/46* (2022.01); *G06V 20/52* (2022.01); *G06V 2201/10* (2022.01)

(58) Field of Classification Search
CPC ............. G06F 16/7867; G06F 16/7328; G06F 16/7837; G06F 18/22; G06K 9/6215; G06K 9/6223; G06V 20/46; G06V 20/52; G06V 2201/10; G06V 10/454; G06V 10/82; G06V 40/161
See application file for complete search history.

(56) References Cited

U.S. PATENT DOCUMENTS

| 2015/0379368 A1* | 12/2015 | Shiiyama | G06F 16/434 |
| | | | 382/201 |
| 2016/0034557 A1* | 2/2016 | Araki | G06F 16/5838 |
| | | | 707/737 |
| 2016/0284092 A1* | 9/2016 | Matsushita | G06F 18/22 |
| 2016/0364883 A1* | 12/2016 | Shiiyama | H04N 5/262 |
| 2017/0026672 A1* | 1/2017 | Dacus | H04N 21/23418 |
| 2017/0039419 A1* | 2/2017 | Shiiyama | G06V 40/50 |

(Continued)

FOREIGN PATENT DOCUMENTS

JP   2007280043 A   10/2007

*Primary Examiner* — Eliyah S. Harper
(74) *Attorney, Agent, or Firm* — Canon U.S.A., Inc. IP Division (57) ABSTRACT

An information processing apparatus includes a first search unit configured to search for a feature of an object extracted from a video image in a registration list in which a feature indicating a predetermined object to be detected and identification information for identifying the predetermined object are registered, a generation unit configured to generate a first list in which at least the ID information about the predetermined object corresponding to the extracted object is registered in a case where the feature of the extracted object is detected in the registration list and generate a second list in which the feature of the extracted object is registered in a case where the feature of the extracted object is not detected in the registration list, and a second search unit configured to search for a target object designated by a user in the first list or the second list.

14 Claims, 9 Drawing Sheets

(56) References Cited

U.S. PATENT DOCUMENTS

| | | | |
|---|---|---|---|
| 2017/0091308 A1* | 3/2017 | Tan | G06F 16/258 |
| 2019/0052925 A1* | 2/2019 | McDowell | G06Q 30/0233 |
| 2019/0272344 A1* | 9/2019 | Lu | G06F 18/21 |
| 2019/0278804 A1* | 9/2019 | Matsushita | G06F 18/24 |
| 2020/0005045 A1* | 1/2020 | Lloyd | G06V 10/96 |
| 2020/0104300 A1* | 4/2020 | Faupel | G06F 16/9536 |
| 2021/0165818 A1* | 6/2021 | Matsushita | G06V 10/761 |
| 2022/0075821 A1* | 3/2022 | Matsushita | G06F 16/7867 |

\* cited by examiner

| DETECTION TARGET PERSON ID | NAME | FEATURE 1 | FEATURE 2 | ADDED-TO-LIST DATE/TIME |
|---|---|---|---|---|
| 8 bytes | 32 bytes | 800 bytes | 800 bytes | 24 bytes |
| 701 | ICHRO SATO | FD3A21 … | FE2933 … | 2019/09/21 11:04:21 |
| 702 | JIRO SUZUKI | 2E31F1 … | 302DE1 … | 2019/10/28 10:24:34 |
| 703 | SABURO TAKAHASHI | 5BG349 … | (n/a) | 2019/10/28 10:25:12 |
| 704 | UNKNOWN | 9945A6 … | A33FB1 … | 2019/10/28 10:26:45 |
| 705 | SIRO TANAKA | E1100D … | E20F11 … | 2019/11/10 15:25:23 |

FIG.8B

| DETECTION DATE/TIME (IMAGE-CAPTURING DATE/TIME) | DETECTION TARGET PERSON ID | IMAGE CAPTURING APPARATUS ID | DEGREE OF SIMILARITY | THUMBNAIL IMAGE FILE NAME |
|---|---|---|---|---|
| 24 bytes | 8 bytes | 32 bytes | 4 bytes | 64 bytes |
| 2019/07/31 11:35:13 | 569 | A4-SE09 | 77 | 20190731-11:35:13-A4-SE09-03.png |
| 2019/09/11 13:44:12 | 20 | A4-NW03 | 94 | 20190911-13:44:12-A4-NW03-01.png |
| 2019/10/28 07:14:22 | 226 | B3-SE04 | 67 | 20191028-07:14:22-B3-SE04-02.png |
| 2019/11/02 22:24:35 | 704 | C1-SW02 | 82 | 20191102-22:24:35-C1-SW02-05.png |
| 2019/11/10 15:25:22 | 142 | B1-NE04 | 89 | 20191110-15:25:22-B1-NE04-01.png |

FIG.8C

| FEATURE ID | FEATURE | IMAGE-CAPTURING DATE/TIME | IMAGE CAPTURING APPARATUS ID | THUMBNAIL IMAGE FILE NAME |
|---|---|---|---|---|
| 16 bytes | 800 bytes | 24 bytes | 32 bytes | 64 bytes |
| 1234561 | 3D3A21 … | 2019/11/11 11:24:51 | A3-SW05 | 20191111-11:24:51-A3-SW05-02.png |
| 1234562 | EE31F1 … | 2019/11/11 11:24:52 | A2-NW08 | 20191111-11:24:52-A2-NW08-01.png |
| 1234563 | 59G349 … | 2019/11/11 11:24:55 | B1-NE12 | 20191111-11:24:55-B1-NE12-05.png |
| 1234564 | 7945A6 … | 2019/11/11 11:25:13 | C4-SE02 | 20191111-11:25:13-C4-SE02-03.png |
| 1234565 | C1100D … | 2019/11/11 11:25:42 | B2-SE01 | 20191111-11:25:42-B2-SE01-01.png |

INFORMATION PROCESSING APPARATUS, INFORMATION PROCESSING METHOD, AND STORAGE MEDIUM

BACKGROUND OF THE DISCLOSURE

Field of the Disclosure

The present disclosure relates to a technique of detecting a specific person in a video image.

Description of the Related Art

There is known a technique of searching for a specific person such as a suspicious person by searching for a face of a person from each frame of a monitored video image. Japanese Patent Application Laid-Open No. 2007-280043 discusses a technique of post-search processing to search for a person satisfying a post-search condition in metadata that is stored after being extracted from a monitored video image on which a real-time search has been performed.

In the technique of Japanese Patent Application Laid-Open No. 2007-280043, the metadata stored after being extracted from the monitored video image greatly is increased in a case where operation continues for a long time. The post-search processing to be performed on a video image captured earlier than the time when real-time search processing is executed is a search through the increased metadata, and thus consumes a long time before a detection result is acquired.

SUMMARY

The present disclosure is directed to searching for a specific object in a video image at a higher speed.

An information processing apparatus includes a first search unit configured to search for a feature of an object extracted from a video image in a registration list in which a feature indicating a predetermined object to be detected and identification (ID) information for identifying the predetermined object are registered, a generation unit configured to generate a first list in which at least the ID information about the predetermined object corresponding to the object extracted from the video image is registered in a case where the feature of the object extracted from the video image is detected in the registration list by the first search unit and generate a second list in which the feature of the object extracted from the video image is registered in a case where the feature of the object extracted from the video image is not detected in the registration list by the first search unit, and a second search unit configured to search for a target object designated by a user in the first list or the second list.

Further features of the present disclosure will become apparent from the following description of exemplary embodiments with reference to the attached drawings.

BRIEF DESCRIPTION OF THE DRAWINGS

FIGS. 8A to 8C are diagrams each illustrating an example of various lists.

DESCRIPTION OF THE EMBODIMENTS

An exemplary embodiment of the present disclosure will be described below with reference to the drawings.

Figure 1:
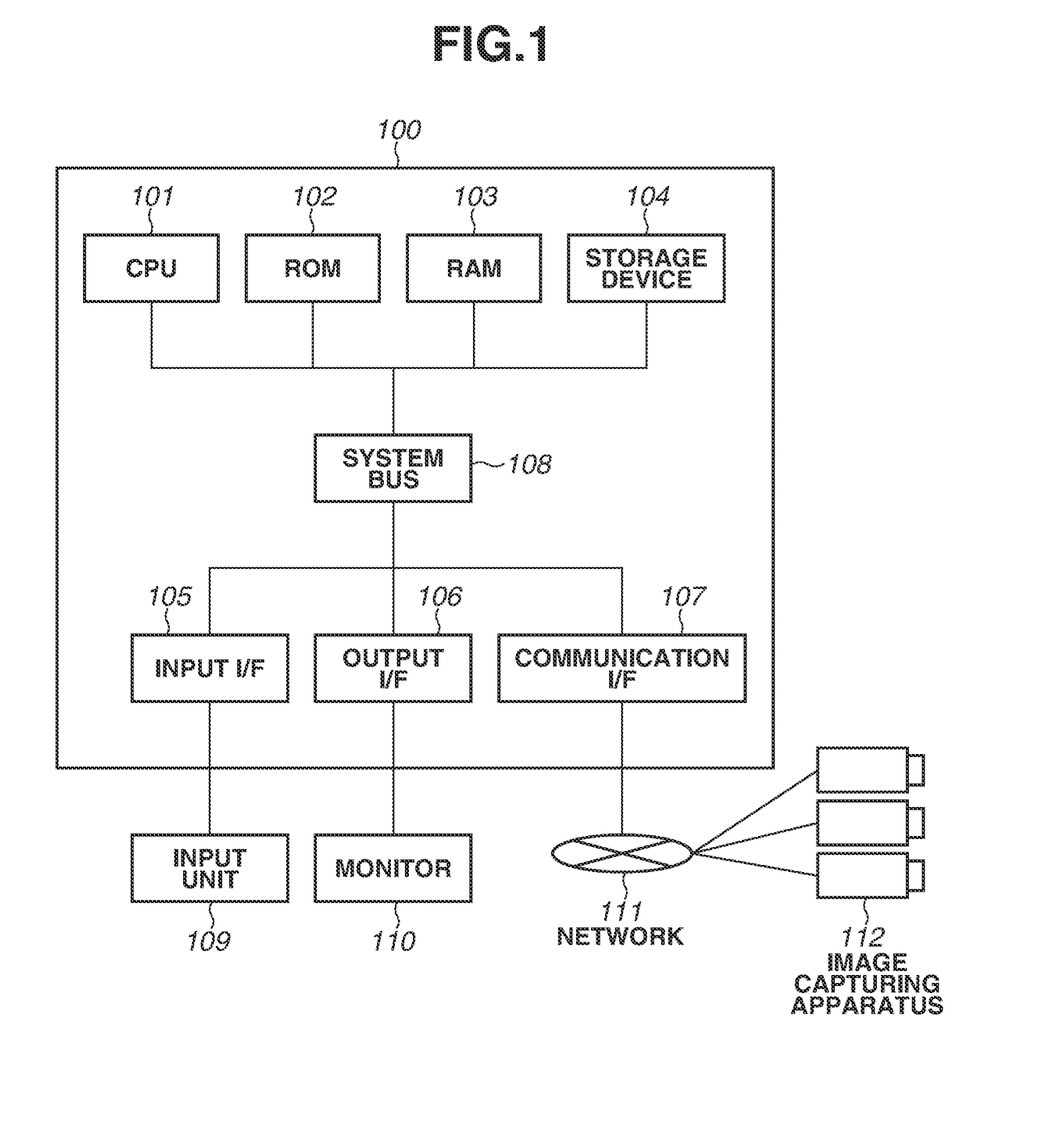
FIG. 1 is a diagram illustrating an example of a hardware configuration of an information processing system.

FIG. 1 is a diagram illustrating an example of a hardware configuration of a monitoring system according to the present exemplary embodiment. The monitoring system includes an information processing apparatus 100, and an image capturing apparatus 112 serving as an image capturing unit, and searches for a human figure designated as a query. FIG. 1 illustrates a case where the monitoring system (an information processing system) includes the three image capturing apparatuses 112, but the number of the image capturing apparatuses 112 is not limited to three in the present exemplary embodiment. The information processing apparatus 100 and the image capturing apparatus 112 are connected via a network 111.

A central processing unit (CPU) 101 controls the entire information processing apparatus 100. A read only memory (ROM) 102 stores a program and a parameter that do not need to be changed. A random access memory (RAM) 103 temporarily stores a program and data supplied from an external apparatus or the like. An external storage device 104 is a storage device, such as a hard disk and a memory card, fixed to the information processing apparatus 100. The external storage device 104 may include a flexible disk (FD), an optical disk such as a compact disc (CD), a magnetic or optical card, an integrated circuit (IC) card, and a memory card that are removable from the information processing apparatus 100. The CPU 101 reads out a program stored in the ROM 102 or the external storage device 104 and executes the program, so that a function and processing of the information processing apparatus 100 to be described below are implemented.

An input interface (IF) 105 is an interface with an input unit 109 including a pointing device and a keyboard for inputting data in response to an operation by a user. An output I/F 106 is an interface with a monitor 110 for displaying data held by the information processing apparatus 100 and supplied data. A communication I/F 107 connects to the network 111 such as the Internet. The image capturing apparatus 112 is a video-image capturing apparatus such as a monitoring camera, and connected to the information processing apparatus 100 via the network 111. A system bus 108 is a transmission channel that connects the units (the CPU 101 to the communication I/F 107) communicatively.

Figure 2:
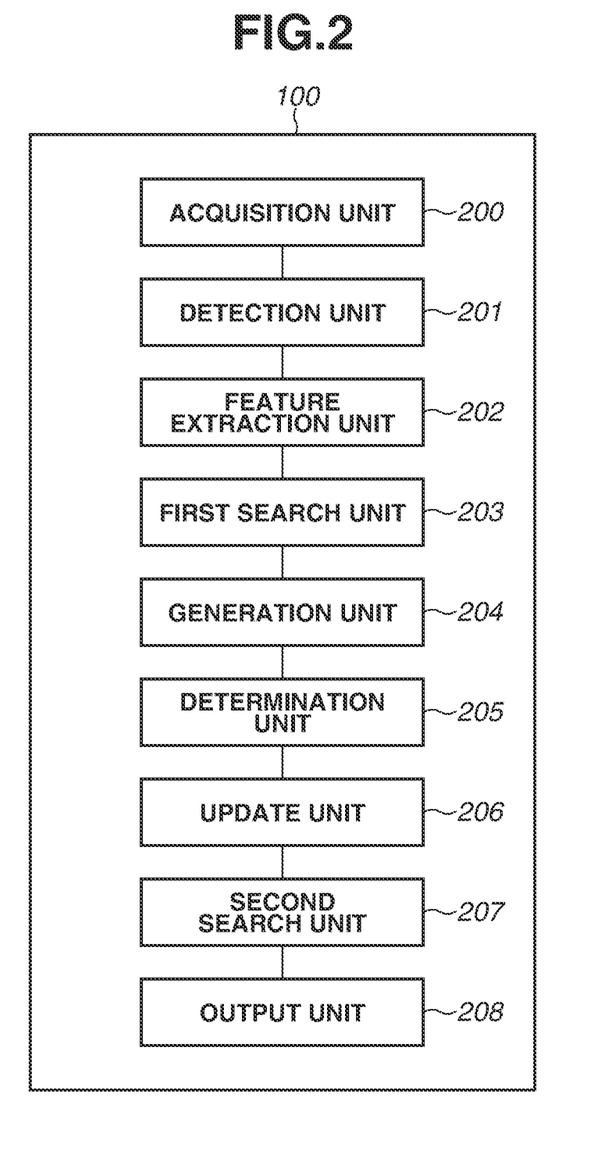
FIG. 2 is a block diagram illustrating an example of a function configuration of an information processing apparatus.

FIG. 2 is a diagram illustrating an example of a function configuration of the information processing apparatus 100 according to the present exemplary embodiment. The information processing apparatus 100 includes an acquisition unit 200, a detection unit 201, a feature extraction unit 202, a first search unit 203, a generation unit 204, a determination unit 205, an update unit 206, a second search unit 207, and an output unit 208. In a case of software, these units are stored in the ROM 102. Each functional unit held in the ROM 102 will be described below.

Figure 3:
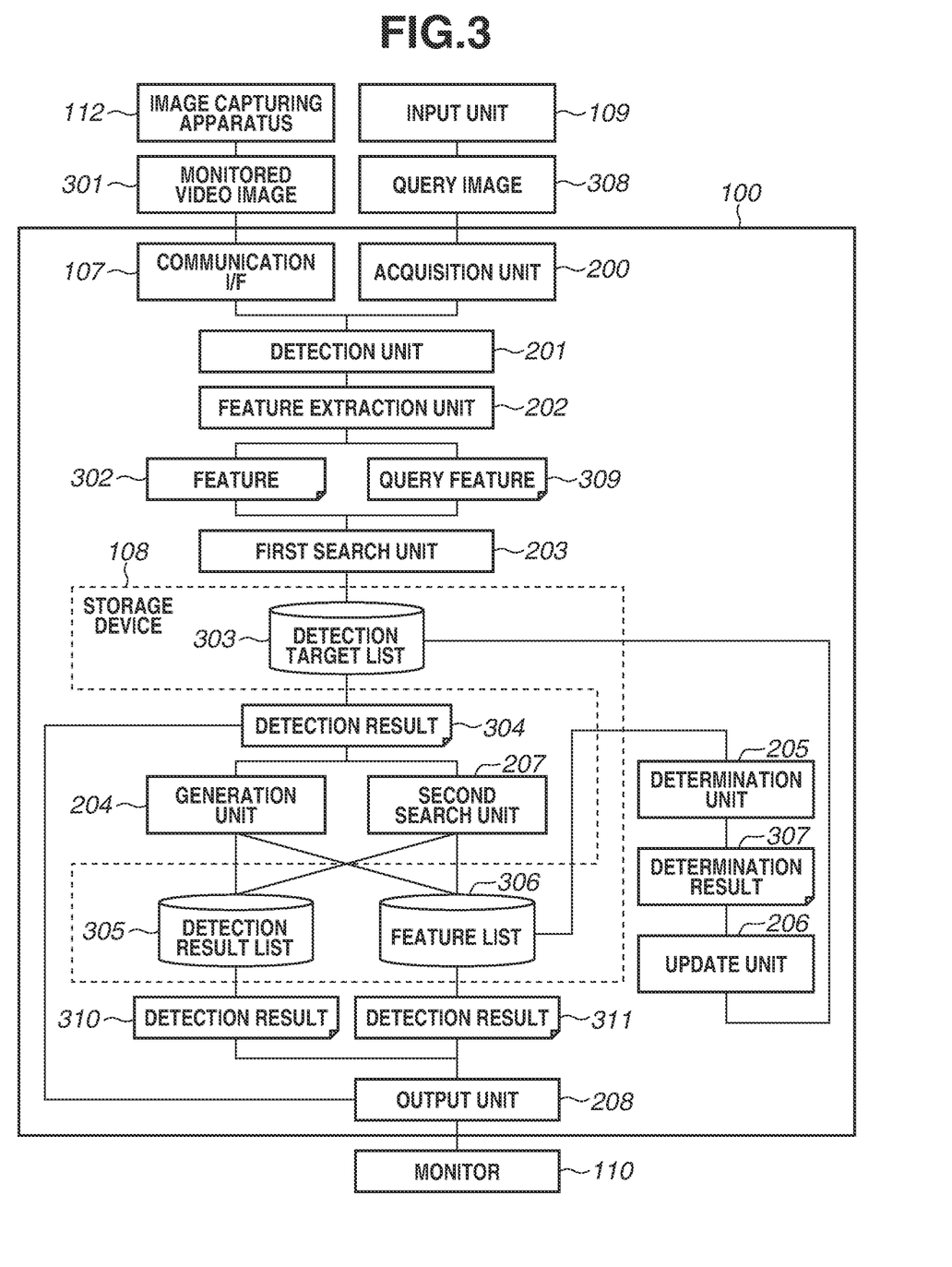
FIG. 3 a diagram illustrating an example of a flow of data in the information processing system.

FIG. 3 is a block diagram illustrating an example of a data flow of information processing performed by the information processing apparatus 100 according to the present exemplary embodiment. In the example in FIG. 3, the information processing apparatus 100 acquires a monitored video image 301 captured by the image capturing apparatus 112 disposed outside, via the network 111 and the communication I/F 107. The monitored video image 301 is composed of sequentially captured images, but is not limited to such a configuration.

The acquisition unit 200 acquires a video image (time-series images) from the image capturing apparatus 112 or the external storage device 104. The detection unit 201 detects an object in the acquired video image. The detection unit 201 analyzes the acquired monitored video image 301, and detects the object appearing in the video image. In the present exemplary embodiment, the object extracted by the detection unit 201 is a face region of a human figure for the purpose of the description, but is not particularly limited a face region of a human figure. For example, the detection unit 201 may extract a person region as the object. A human figure or a face region in the image is detected using a template or a model of a human body or a face prepared beforehand. Subsequently, the feature extraction unit 202 extracts a feature indicating a predetermined object from the video image. In other words, from the object detected by the detection unit 201, the feature extraction unit 202 extracts a feature 302 that is an image feature of the detected object.

Based on a degree of similarity between the extracted feature 302 and a feature indicating a predetermined object registered in a detection target list 303 (a registration list), the first search unit 203 searches for the detected object in the detection target list 303. FIG. 8A illustrates an example of the detection target list 303 (the registration list). Image features each indicating a predetermined object to be detected among objects appearing in a video image is registered in the detection target list 303. Each of the image features is associated with at least identification (ID) information (the ID and the name of a person to be detected) for individually distinguishing the predetermined object. Further, each of the image features is registered together with date/time information (an added-to-list date/time) of the registration of the object in the detection target list 303. An object to be registered is designated by a user. A plurality of features may be registered for one object. In this example, in a case where one feature is registered for one object, for example, a data amount is 864 bytes for each object, as represented by the sum of bytes in the second row in FIG. 8A. When an object desired to be detected in real time is on the order of 10000, the data amount of the detection target list 303 is about 10 megabytes at most. In a case where a feature having a higher degree of similarity than a predetermined degree of similarity (a first threshold) TH1 (e.g., 60, for a degree-of-similarity range from 0 to 100) is present, the ID information about a person to be detected associated with the feature is acquired as a detection result 304. Further, in a case where the highest degree of similarity is higher than a predetermined degree of similarity (a third threshold) TH3 (e.g., 90), the ID information about the detection result 304 is output to the monitor 110. The detection target list 303, a detection result list 305, and a feature list 306 to be described below are collectively referred to as the list, but may each be any of a list, a database, a table, and data indicating the correspondence between a certain image feature and information that can identify an individual.

In a case where the object detected in the video image is detected in the detection target list 303 (the registration list) by the first search unit 203, the generation unit 204 generates the detection result list 305 (a first list) in which at least the ID information about the predetermined object corresponding to the object extracted from the video image is registered. Further, in a case where the object detected in the video image is not detected in the detection target list 303 (the registration list) by the first search unit 203, the generation unit 204 generates the feature list 306 (a second list) in which the feature of the object extracted from the video image is registered.

The ID information and the time are registered in the detection result list 305 as a first detection result, so that the result detected in real time can be confirmed later and can also be utilized as a past detection result to be described below. FIG. 8B illustrates an example of the detection result list 305. A date and time of detection of an object (a detection date/time, i.e., an image-capturing date/time) and image capturing apparatus information (an image capturing apparatus ID) are registered in the detection result list 305. These are registered together with the ID information about the detected object (an ID of a person to be detected), a degree of similarity, and a thumbnail image of a clipped object region (a thumbnail image file name). In particular, the ID information about the object is associated with the first column of the detection target list 303. The detection result list 305 is built on an ordinary relational database (RDB), using the ID information about the object (the ID of a person to be detected) that is a scalar value, as a key, so that a search can be performed at high speed based on the ID information of the object (the ID of a person to be detected). In this example, a data amount is 132 bytes for each detection result, as represented by the data amount in the second row in FIG. 8B. When the detection result is on the order of 100 million, the data amount of the detection result list 305 is about 13 gigabytes, and this is an amount that can also be loaded into the RAM. In the example in FIG. 3, the detection result list 305 is in the external storage device 104. In a case where the detection result is also loaded into the RAM 103, a search can be performed at high speed.

On the other hand, in a case where the object detected in the video image is not detected in the detection target list 303 (the registration list) by the first search unit 203, the feature list 306 (the second list) in which the feature of the object extracted from the video image is registered is generated. In other words, in a case where the object detected in the video image is not detected as the detection result 304, or in a case where a predetermined object corresponding to a higher degree of similarity than a predetermined degree of similarity (a second threshold) TH2 is not detected in the detection target list 303, the feature 302 calculated by the feature extraction unit 202 is registered in the feature list 306. FIG. 8C illustrates an example of the feature list 306 (the second list). In the feature list 306, a feature of an object is registered together with an ID (a feature ID) for uniquely identifying the feature, an image-capturing date/time, information about an image capturing apparatus (an image capturing apparatus ID), and a thumbnail image of a clipped image (a thumbnail image file name). In this example, a data amount is 936 bytes for each feature, as represented by the data amount in the second row in FIG. 8C. When the number of registrations is on the order of 100 million, the data amount of the feature list 306 is about 94 gigabytes. The feature list 306 is used for a search using a feature as a query, but the feature is typically a multidimensional vector, and thus a search cannot be performed at high speed using an ordinary RDB. Therefore, an index corresponding to the multidimensional feature is generated. The generation of the index will be described below. Even in such a case, in a case where a search is performed while data is read from a hard disk drive, the time consumed for the search is ten times longer than a time in a case where searching through data loaded into a RAM is performed. In the example in FIG. 3, the feature list 306 is in the external storage device 104. The search can be performed at high speed by also loading the data into the RAM 103, but it may be desirable to mount a RAM having a size of 100 GB or more as the RAM 103.

The total data amount can be reduced by registering a person frequently appearing in a video image in the detection target list 303 (the registration list), among objects except for an object already registered in the detection target list 303. The total data amount when an object is imaged n times by the image capturing apparatus 112 is (864+132n) bytes when the object is registered in the detection target list 303, and 936n bytes when the object is not registered in the detection target list 303. Therefore, the total data amount can be reduced by detecting a frequently appearing object and registering the detected object in the detection target list 303. The determination unit 205 determines an object frequently registered in the feature list 306, based on a degree of similarity between features registered in the feature list 306. A representative feature of the object is acquired as a determination result 307. The update unit 206 updates the detection target list 303 (the registration list), by registering the feature of the object of the determination result 307 determined by the determination unit 205, in the detection target list 303. Those objects can also be detected by the first search unit 203 afterward. The number of objects that can be searched for in the detection result list 305 is thereby increased, so that a search can be performed at higher speed. The registration amount in the feature list 306 can be further reduced, so that a further reduction in memory amount and a search at higher speed can be achieved.

In search processing according to the present exemplary embodiment, at first, the acquisition unit 200 acquires a query image 308 indicating a target object designated using the input unit 109 by the user, via the input I/F 105. Next, as with the data registration processing performed by the information processing apparatus 100, the detection unit 201 detects the target object appearing in the query image 308. Further, the feature extraction unit 202 extracts a query feature 309 that is a feature of the target object detected in the query image 308.

As with the list generation processing performed by the information processing apparatus 100, the first search unit 203 searches for the target object in the detection target list 303, by comparing the query feature 309 indicating the target object and a feature registered in the detection target list 303. The ID information about a predetermined object indicating a feature matching with the query feature 309 of the target object and the date/time information registered in the detection target list 303 are acquired as the detection result 304.

In a case where the target object is present in the detection target list 303 (the registration list) as the detection result 304, the second search unit 207 searches for the target object in the detection result list 305 (the first list), based on the ID information about the object of the detection result 304. Specifically, information (such as a thumbnail image, information about an image-capturing time, information about an image capturing apparatus, and a degree of similarity) about the target object is acquired as a detection result 310. Further, in a case where the target object is not present in the detection target list 303 (the registration list), the second search unit 207 searches for a feature similar to the query feature 309, based on the degree of similarity calculated based on features, among the features registered in the feature list 306 (the second list). Specifically, information (such as a thumbnail image, information about an image-capturing time, information about an image capturing apparatus, and a degree of similarity) about the target object is acquired as a detection result 311. The second search unit 207 stores the detection result 310 and the detection result 311 on the RAM 103. Subsequently, the second search unit 207 outputs the thumbnail image of the object in each of the detection result 310 and the detection result 311 to the monitor 110.

In a case where the target object is detected in the detection result list 305 or the feature list 306 (the first list or the second list), the output unit 208 outputs a notification to the user. Specifically, the monitor 110 presents the detection result 304 obtained by the first search unit 203 to the user. In the presentation, an alert may be issued by causing a part or the whole of the screen to blink, in addition to the display of the detection result. Further, a warning light (not illustrated) may be added to the system to issue an alert. The monitor 110 presents the detection result 310 and the detection result 311 acquired by the second search unit 207 to the user.

The input unit 109 and the monitor 110 may be in a different apparatus, and may transmit and receive the query image 308, the query feature 309, the detection result 310, and the detection result 311 via the communication I/F 107. A control program is not limited to programs stored in the ROM 102, and a configuration in which some of those programs are stored in a different apparatus may be adopted. For example, there may be adopted such a configuration that the detection unit 201 and the feature extraction unit 202 are built in the image capturing apparatus 112 or included in a different server, and the information processing apparatus 100 includes only the first search unit 203, the generation unit 204, and the second search unit 207. In a case where such a configuration is adopted, the processing of analyzing a video image and the processing related to search can be performed in separate apparatuses, so that hardware specifications suitable for each processing can be selected. All the above-described configurations may be included in one information processing apparatus.

The method for detection of a face region by the detection unit 201 is not particularly limited. In the following, the detection unit 201 uses a scheme of determining whether each search window is a face region, by training the feature of the face region beforehand, and scanning an input image using the search windows. As a training method therefor, for example, a deep learning technique such as ensemble learning or Convolutional Neural Network (CNN) may be used. The method for extraction of a feature of an object by the feature extraction unit 202 is not particularly limited, either. For example, the feature extraction unit 202 may calculate a color histogram of a partial area in a face region as a feature, or may use a calculation method employing a deep learning technique such as CNN.

Each step of a flowchart to be described in the present exemplary embodiment may be implemented by software using a CPU, or may be implemented by hardware such as an electronic circuit.

Figure 4:
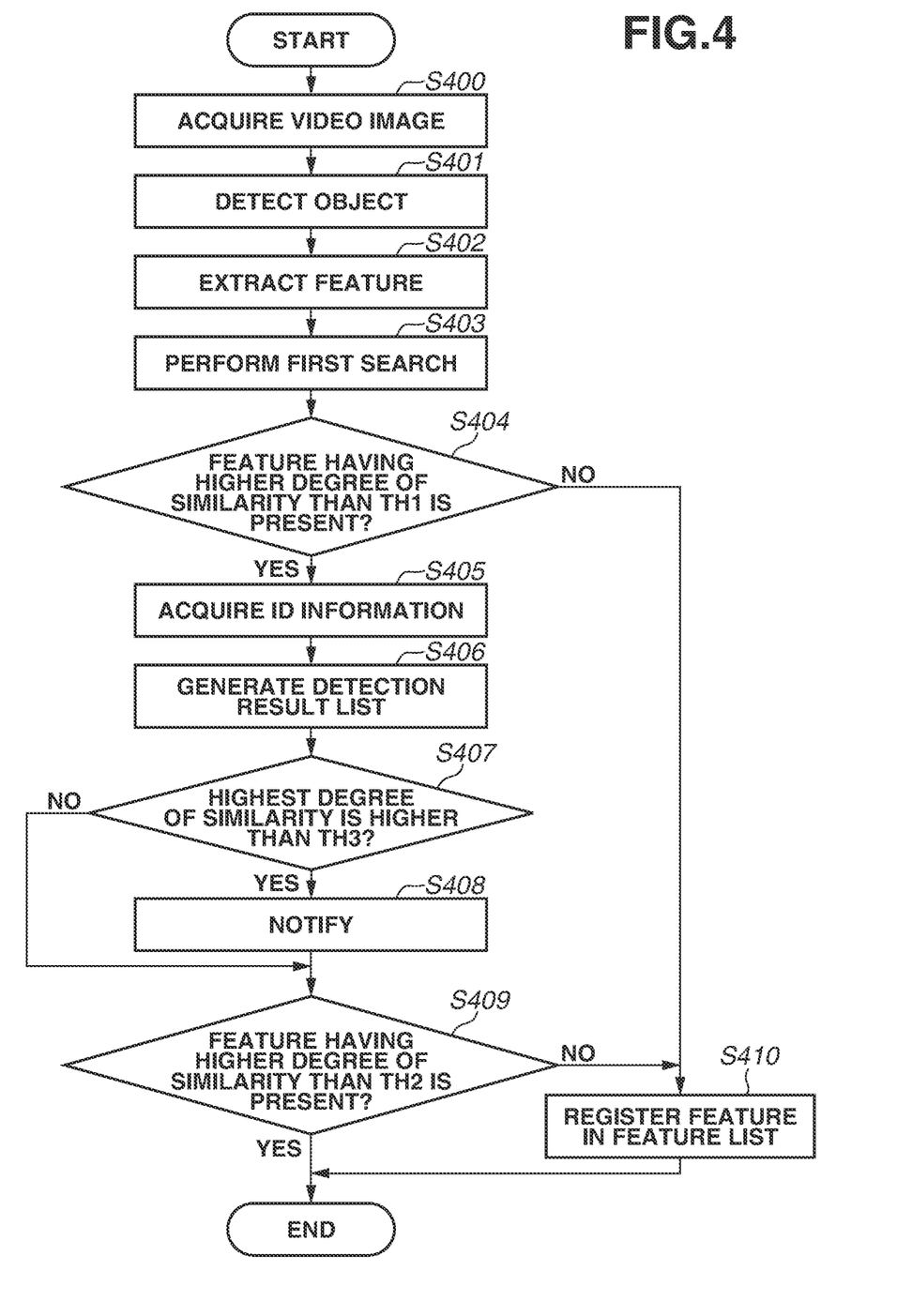
FIG. 4 is a flowchart illustrating processing executed by the information processing apparatus.

Among the above-described processes performed by the information processing apparatus 100, the list generation processing will be described with reference to a flowchart. The list generation processing is advance preparation processing, and can be executed, for example, in a case where detection of a predetermined human figure in a video image being monitored is performed as a real-time search, and in a case where feature lists to search through past data using a query image are accumulated. FIG. 4 is a flowchart illustrating an example of the list generation processing performed by the information processing apparatus 100 according to the present exemplary embodiment. The CPU 101 illustrated in FIG. 1 as a computer executes steps in the flowchart in each of FIG. 4 to FIG. 7, based on a computer program stored in the external storage device 104.

First, in step S400, the acquisition unit 200 acquires a video image to be searched. The video image to be searched here may be a video image captured in real time by the image capturing apparatus 112, or may be a video image captured in the past. In step S401, the detection unit 201 detects an object in the acquired video image. In step S402, the feature extraction unit 202 extracts a feature of the object detected in the video image. The object detected in the video image may be one object or may be a plurality of objects. In step S403, the first search unit 203 searches for an object registered in the detection target list 303, based on a degree of similarity between the extracted feature 302 and a feature indicating a predetermined object registered in the detection target list 303 (the registration list). In other words, the first search unit 203 acquires the degree of similarity by comparing the extracted feature 302 and the feature of the predetermined object registered in the detection target list 303 (the registration list). A plurality of predetermined objects may be registered in the detection target list 303 to be used for the comparison. In that case, the degree of similarity is acquired for the combination of the feature 302 extracted from the video image and each of the features in the registration list. In step S404, the first search unit 203 determines whether a feature having a higher degree of similarity than the first threshold TH1 is present. If such a feature is present (YES in step S404), the processing proceeds to step S405. If a feature having a higher degree of similarity to the feature of the object detected in the video image than the first threshold TH1 is not present in the detection target list 303 (the registration list) (NO in step S404), the processing proceeds to step S410.

In step S405, the generation unit 204 acquires the detection result 304 indicating that the object detected in the video image is detected in the detection target list 303 (the registration list). In step S406, the generation unit 204 generates the detection result list 305 (the first list) in which at least ID information about a predetermined object corresponding to the object detected in the video image is registered. In other words, the detection result 304 is added to the detection result list 305. In this process, in a case where a plurality of results is included in the detection result 304, a thumbnail image, information about an image-capturing time, information about an image capturing apparatus, a degree of similarity, etc. are registered in association with ID information about each of a plurality of persons to be detected. Data having a large size such as the thumbnail image is stored in a different file or different region, and information representing a link to the different file or different region is associated with the ID information about the person to be detected. The detection result list 305 is also used when the past data is comprehensively searched. In such a case, it is desirable to decrease a case that no person is detected even if misdetection is included. Therefore, a low threshold that is less likely to cause a case that no person is detected is set as the first threshold TH1. When the number of detection results registered in association with the ID information about the person to be detected exceeds a predetermined number, a detection result having a low degree of similarity may be deleted from the detection result list 305. In other words, in a case where the number of features indicating the same object among the features registered in the detection result list 305 (the first list) is greater than a predetermined number, the generation unit 204 deletes a feature having a lower degree of similarity to the feature of the predetermined object from the detection result list 305. This reduces misdetection, so that the search processing can be performed more efficiently.

In step S407, the generation unit 204 determines whether the highest degree of similarity among degrees of similarity to the feature of the object detected in the video image among the features registered in the detection target list 303 is higher than the third threshold TH3. If the highest degree of similarity is higher than the third threshold TH3 (YES in step S407), the processing proceeds to step S408. If the highest degree of similarity is less than or equal to the third threshold TH3 (NO in step S407), the processing proceeds to step S409. In step S408, the output unit 208 outputs the ID information about the detection result 304 to the monitor 110, thereby notifying the user of an alert. As for the alert presented to the user in the case of real-time detection, it is desirable to have less misdetection. If misdetection frequently occurs, the user stops confirming the result even if an alert is issued. Therefore, a high threshold that is less likely to cause misdetection is set as the third threshold TH3. In other words, the first threshold TH1 is set to a value lower than the third threshold TH3. In step S409, the generation unit 204 determines whether a feature having a higher degree of similarity to the feature of the object detected in the video image than the second threshold TH2 is present among the features registered in the detection target list 303. If a feature having a higher degree of similarity to the feature of the object detected in the video image than the second threshold TH2 is present (YES in step S409), the processing ends. If a feature having a higher degree of similarity to the feature of the object detected in the video image than the second threshold TH2 is not present (NO in step S409), the processing proceeds to step S410.

Figure 9:
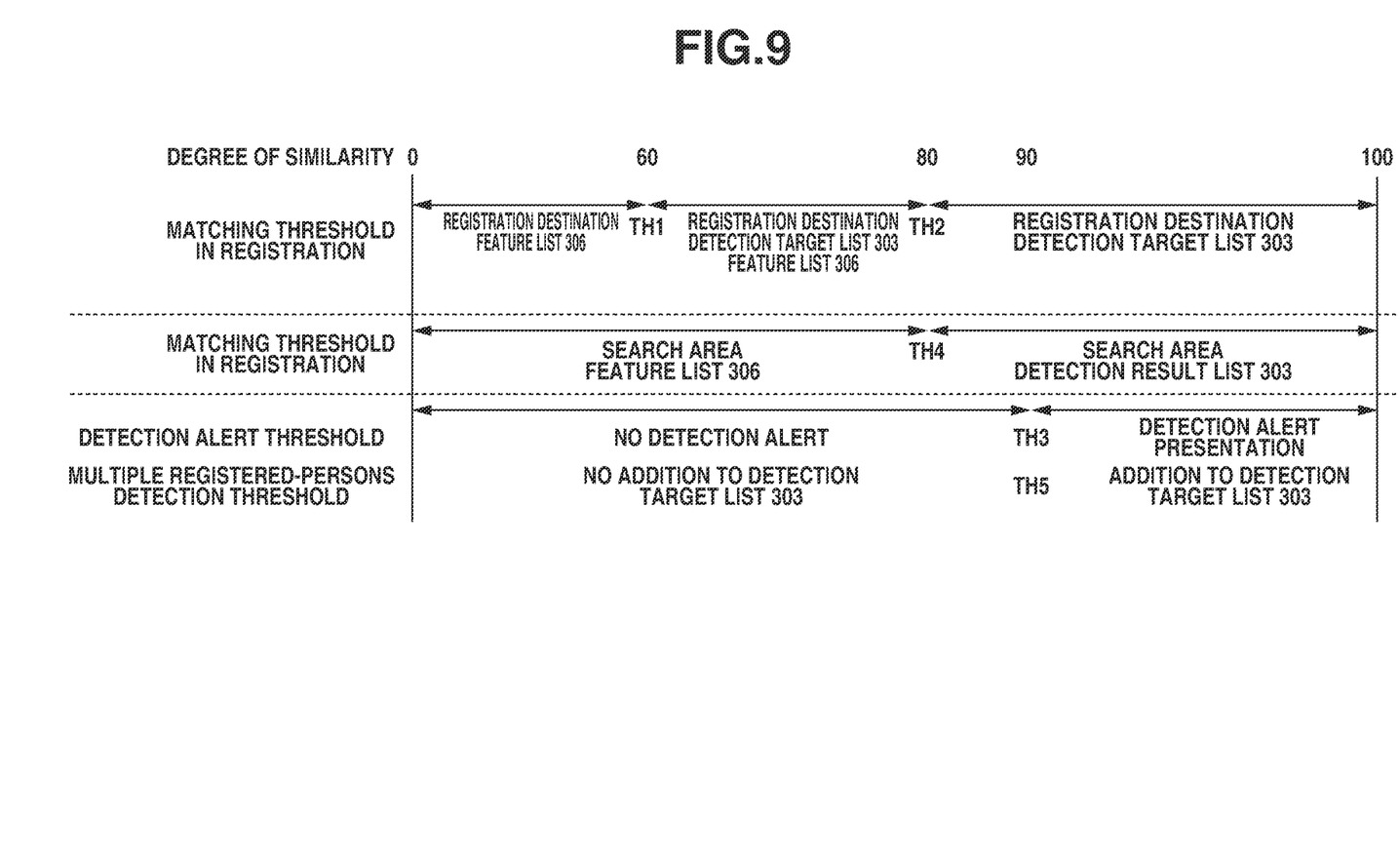
FIG. 9 is a diagram illustrating an example of thresholds.

If a feature having a higher degree of similarity than the first threshold TH1 is not present in step S404, or if a feature having a higher degree of similarity than the second threshold TH2 is not present in step S409, then in step S410, the feature 302 is registered in the feature list 306. A value higher than the first threshold TH1 is set as the second threshold TH2. In other words, as illustrated in examples of the thresholds in FIG. 9, when a result having a higher degree of similarity than the second threshold TH2 is present, i.e., when a result having a high degree of similarity to the detection target list 303 is present, the reliability of the result is high, and thus the feature 302 is registered only in the detection result list 305. However, when a result having a higher degree of similarity than the first threshold TH1 is present but a result having a higher degree of similarity than the second threshold TH2 is not present, the detected object can be a different object (hereinafter referred to as the candidate object), and moreover, no applicable object can be present in the detection target list 303. Therefore, in such a case, the feature 302 is registered in both of the detection result list 305 and the feature list 306, as the candidate object for the predetermined object. When a result having a higher degree of similarity than the first threshold TH1 is not present, the feature 302 is registered only in the feature list 306.

Figure 5:
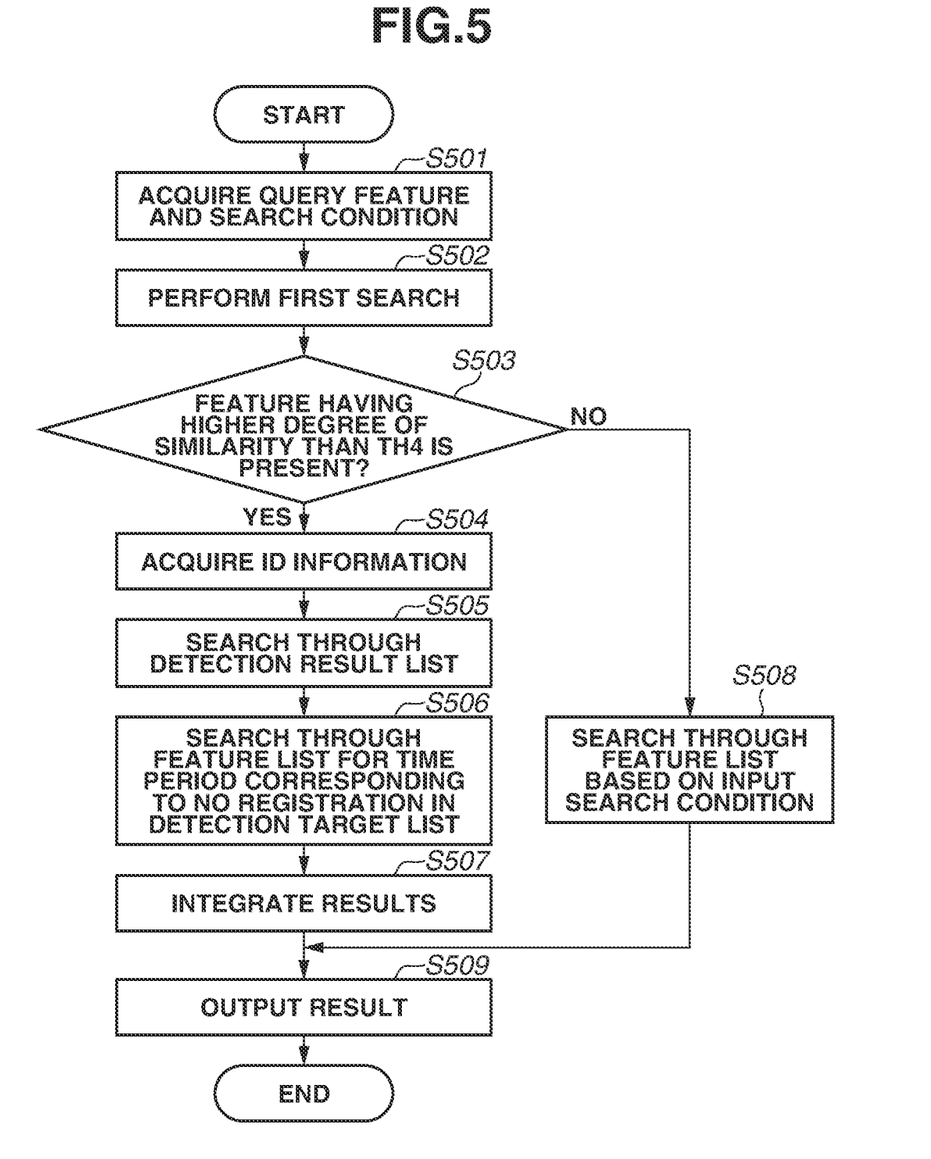
FIG. 5 is a flowchart illustrating processing executed by the information processing apparatus.

Among the above-described processes performed by the information processing apparatus 100, the processing related to post search will be described with reference to a flowchart. The post search processing is processing of retroactively detecting a predetermined human figure in a monitored video image in the past, and can be executed after the detection result list 305 and the feature list 306 are generated in the above-described list generation processing. FIG. 5 is a flowchart illustrating an example of the search processing performed by the information processing apparatus 100 according to the present exemplary embodiment. First, in step S501, the acquisition unit 200 acquires a query feature extracted from a query image indicating a target object designated by the user. The acquisition unit 200 acquires a user input designating a search range such as an image-capturing time and an image capturing apparatus corresponding to an image serving as a search target. In a case where the target object appears in a specific region of the acquired image, the region including the target object is determined by the user input. In a case where one image includes a plurality of objects, one or a plurality of target objects are designated. The search range input into the first search unit 203 may include all times and all image capturing apparatuses, or may include a specific time and a specific image capturing apparatus. In step S502, the first search unit 203 calculates a degree of similarity by comparing the query feature 309 and the feature registered in the detection target list 303. In step S503, the first search unit 203 determines whether a feature having a higher degree of similarity than a fourth threshold TH4 is present in the detection target list 303 (the registration list). If a feature having a higher degree of similarity than the fourth threshold TH4 is present in the detection target list 303 (the registration list) (YES in step S503), the processing proceeds to step S504. If a feature having a higher degree of similarity than the fourth threshold TH4 is not present in the detection target list 303 (the registration list) (NO in step S503), the processing proceeds to step S508. Desirably, the fourth threshold TH4 is about the same level as the second threshold TH2 for determining whether to execute registration in the feature list 306. This is because, if the degree of similarity is higher than the second threshold TH2, the result included in the detection result list 305 is reliable, and if the degree of similarity is not higher than the second threshold TH2, the feature is also registered in the feature list 306 and thus can be searched for in step S508 to be described below.

In step S504, the second search unit 207 searches through the detection target list 303 (the registration list) to find ID information about a registered object corresponding to the target object, and acquires the detection result 304. The ID information includes at least information that can identify the object, and further includes time information indicating a date and time when the object is registered in the detection result list 305 (the first list). Next, in step S505, the second search unit 207 searches for the target object in the detection result list 305 (the first list), based on the ID information about the object of the detection result 304. Based on the ID information about the object of the detection result 304, the detection result 310 is acquired from the detection result list 305. In this process, in a case where a plurality of results is included in the detection result 304, the detection result 310 of each of a plurality of persons to be detected is acquired.

In step S506, the second search unit 207 searches for the target object in the feature list 306 (the second list), for a time period before the time when the feature of the predetermined object is registered in the detection result list 305 (the first list). In other words, the second search unit 207 searches through the feature list 306 (the second list) to find a feature having a higher degree of similarity to the query feature, for a time period in which the person to be detected in the detection result 304 is not registered in the detection target list 303, and acquires the detection result 311. In a case where a plurality of results is included in the detection result 304, a search using a search target time period set for each person to be detected is performed, and the results are integrated. In the integration of the results, a degree of similarity y acquired from the detection result list 305 is corrected using a degree of similarity x to the detection target list 303. In other words, for example, a corrected degree of similarity y_refine is calculated by the following equation (1), using the degree of similarity x, the degree of similarity y, and a weight w.

$$y\_refine = x - w(1-x)(1-y) \quad (1)$$

In step S507, the second search unit 207 integrates the results of searching for the target object in the first list or the second list. In other words, the detection result 310 and the detection result 311 are integrated. Finally, in step S509, the output unit 208 outputs the detection result to the monitor 110 via the output I/F 106.

If a feature having a higher degree of similarity than the predetermined degree of similarity (the fourth threshold TH4) is not present (NO in step S503), the processing proceeds to step S508. In step S508, the second search unit 207 searches through the feature list 306 to find a feature having a high degree of similarity to the query feature, based on the input search condition, and acquires the detection result 311. Finally, in step S509, the output unit 208 outputs the result to the monitor 110 via the output I/F 106.

Figure 6:
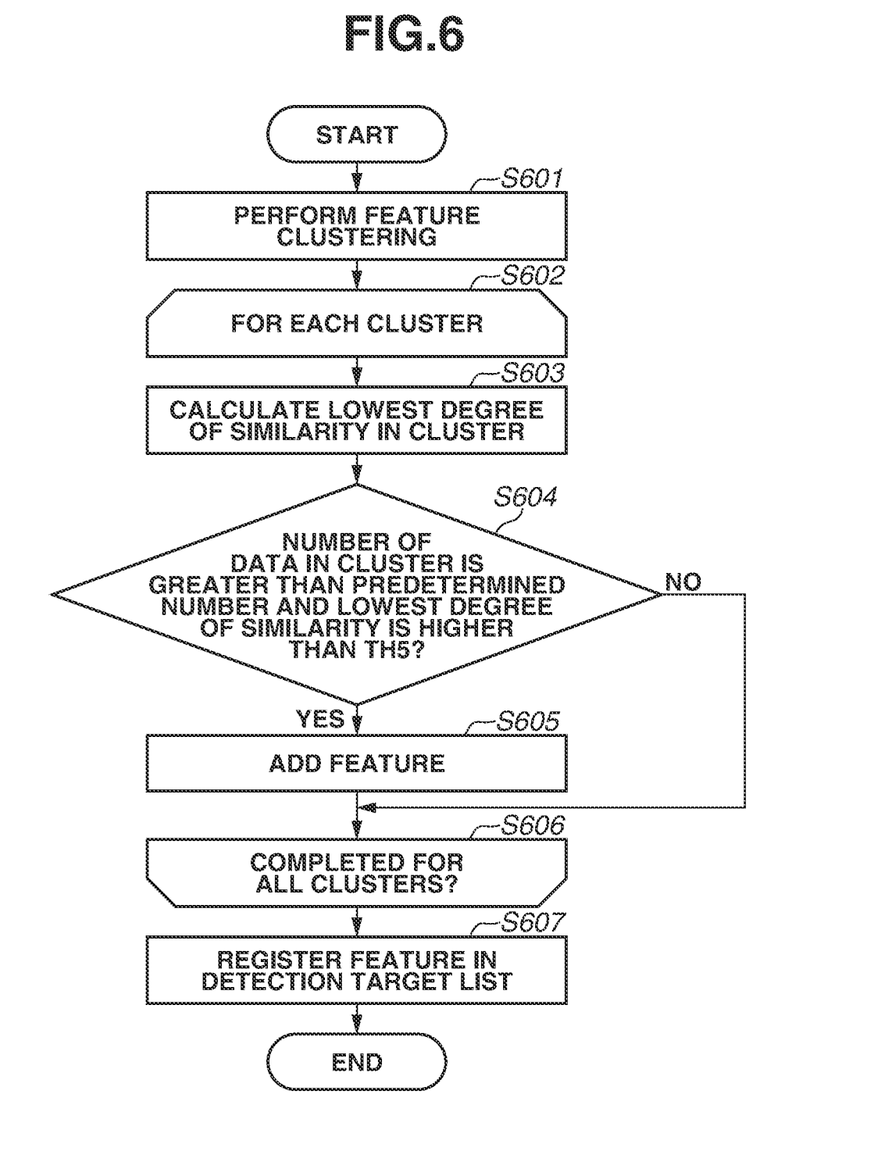
FIG. 6 is a flowchart illustrating processing executed by the information processing apparatus.

Among the above-described processes performed by the information processing apparatus 100, the update processing will be described with reference to a flowchart in FIG. 6. In the update processing of updating a list, in a case where a video image is captured in a time period designated beforehand is acquired, the registration list is updated, for example, at the timing designated by the user, such as midnight on weekend. Alternatively, the update processing may be executed depending on the data amount of the feature list 306 in a case where, for example, the registration amount exceeds a predetermined value. FIG. 6 is a flowchart illustrating an example of the update processing of updating the detection target list 303 performed by the information processing apparatus 100 according to the present exemplary embodiment. First, in step S601, the generation unit 204 identifies clusters each having similar features among a plurality of features registered in the feature list 306. The generation unit 204 performs index generation to search for multidimensional features at high speed, i.e., performs clustering of the feature list 306, based on the features registered in the feature list 306. For the clustering, a k-means method can be used. Specifically, at first, the features are randomly classified into k clusters. Afterward, the cluster center (the centroid of feature) of each of the clusters is calculated, and new clusters are generated by classifying data based on the nearest cluster center, and such calculation and generation are repeated until the cluster center does not change anymore.

In step S602 to step S606, step S603 to step S605 are performed on each cluster until all the clusters are processed. In other words, in step S603, the generation unit 204 calculates the lowest degree of similarity among the degrees of similarity between the data in the cluster. In step S604, the determination unit 205 determines whether the number of data in the cluster is greater than a predetermined number and the lowest degree of similarity is higher than a fifth threshold TH5.

If the number of data in the cluster is greater than the predetermined number and the lowest degree of similarity is higher than the fifth threshold TH5 (YES in step S604), the processing proceeds to step S605. In step S605, the determination unit 205 adds the feature of the cluster center to the determination result 307. Desirably, the fifth threshold TH5 is about the same level as the third threshold TH3 used to present an alert to the user in the real-time detection. The processing returns to step S603 to process the next cluster. If the lowest degree of similarity is not higher than the fifth threshold TH5 (NO in step S604), the processing proceeds to step S606 and then also returns to step S603 to process the next cluster.

In step S607, the update unit 206 registers the feature of the determination result 307 in the detection target list 303 (the registration list). However, the feature registered in the flow is not an object for which the user wants to issue an alert. Therefore, the feature registered in the detection target list 303 in the flow and the feature of the object designated by the user are registered to be distinguishable from each other. In step S406 of the flowchart in FIG. 4, the determination unit 205 performs determination as to whether the person to be detected is the object designated by the user, in addition to the comparison based on the degree of similarity. An alert can be issued only when the person to be detected is the object designated by the user.

As described above, the information processing apparatus 100 according to the present exemplary embodiment performs matching against the detection target list 303 when the monitored video image 301 is input, and in a case where there is a detection result having a higher degree of similarity than the predetermined degree of similarity, the information processing apparatus 100 registers the result in the detection result list 305. The feature extracted from the video image is not registered into the feature list 306. This can reduce the registration amount in the feature list 306, so that a reduction in memory amount and an increase in search speed can be achieved. When the query image 308 is input, matching against the detection target list 303 is performed, and in a case where there is a detection result having a higher degree of similarity than the predetermined degree of similarity, the result is acquired from the detection result list 305. The search through the feature list 306 applies to only a time period corresponding to no registration in the detection result list 305. The acquisition of the result from the detection result list 305 is key search processing, so that the processing can be performed at high speed using less memory. The search speed can be further increased by reducing the search range of the feature list 306. The object frequently registered in the feature list 306 is additionally registered in the detection target list 303, so that the object is registered in the detection result list 305, not in the feature list 306, by the processing performed when the monitored video image 301 is input. This can increase the number of objects that can be searched for in the detection result list 305, so that the search speed can be increased. The registration amount in the feature list 306 can be further reduced, so that a further reduction in memory amount and a further increase in search speed can be achieved.

In the list generation processing described with reference to FIG. 4, the features to be registered in the feature list 306 are reduced. However, all the extracted features may be registered in the feature list 306. In this case, at the time of the search illustrated in FIG. 5, the detection result is acquired from the detection result list 305, and the feature list 306 is searched in a reduced search range. In such a configuration as well, the search speed can be increased.

Figure 7:
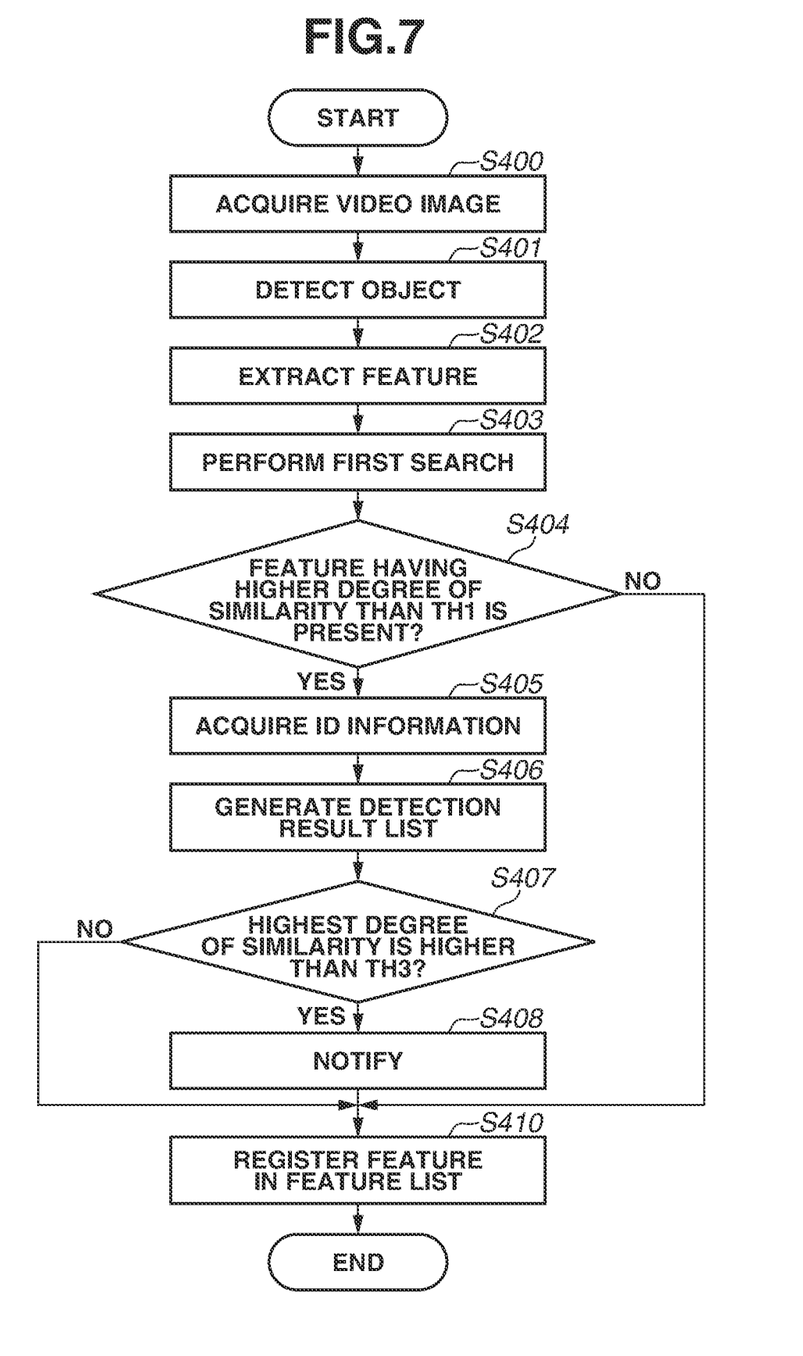
FIG. 7 is a flowchart illustrating processing executed by the information processing apparatus.

Among the above-described processes performed by the information processing apparatus 100, the processing related to list generation will be described with reference to a flowchart. FIG. 7 is a flowchart illustrating another example of the registration processing performed by the information processing apparatus 100 according to the present exemplary embodiment. Step S409 in FIG. 4 is removed, and the registration in the feature list 306 in step S410 is always performed irrespective of the detection result 304 acquired from the detection target list 303. In other words, if the highest degree of similarity is not higher than the third threshold TH3 (NO in step S407), the processing skips issuing an alert to the user in step S408, and proceeds to step S409 to perform the registration. The flowchart of the search processing and the flowchart of the update processing performed by the information processing apparatus 100 are similar to those in FIG. 5 and FIG. 6.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-149008, filed Sep. 4, 2020, which is hereby incorporated by reference herein in its entirety.

What is claimed is:

1. An information processing apparatus comprising:
at least one processor configured to function as:
a first determination unit configured to determine whether a feature similar to a feature of an object extracted from a video image is detected in a registration database in which a feature of an object and identification (ID) information for identifying the object are associated with each other;
a control unit configured to: in a case where the first determination unit determines that the feature similar to the feature of the object extracted from the video image is detected in the registration database, add identification information of the object and a detection time of the object to a first database in which identification information of an object and a detection time of the object are associated with each other, and in a case where the first determination unit determines that the feature similar to the feature of the object extracted from the video image is not detected in the registration database, add the feature of the object and the detection time of the object to a second database in which a feature of an object and a detection time of the object are associated with each other;
a second determination unit configured to determine, based on whether a feature similar to a feature of the target object contained in the query is detected in the registration database, one or more database used for searching for a detection time of the target object from among the first database and the second database both of which are different from the registration database.

2. The information processing apparatus according to claim 1,
wherein the second determination unit determines to search for the target object in the first database in a case where the feature similar to the feature of the target object is detected in the registration database, and the second determination unit determines to search for the target object in the second database in a case where the feature similar to the feature of the target object is not detected in the registration database.

3. The information processing apparatus according to claim 2, wherein the second determination unit further determines to search for the target object in the second database for a time period before a time when the feature of the target object is registered in the first database, in a case where the feature similar to the feature of the target object is detected in the registration database.

4. The information processing apparatus according to claim 2, wherein the first determination unit is further configured to determine if the feature similar to the feature of the target object is detected in the registration database, wherein the first determination unit determines that the feature similar to the feature of the target object is detected in the registration database in a case where a degree of similarity between the feature of the target object and the feature of the object registered in the registration database is higher than a first threshold, and the first determination unit determines that the feature similar to the feature of the target object is not detected in the registration database in a case where the degree of similarity is lower than or equal to the first threshold.

5. The information processing apparatus according to claim 1, wherein the at least one processor is further configured to function as an update unit configured to update, in a case where a number of objects included in a cluster having similar features among a plurality of features registered in the second database is greater than a predetermined value, the registration database by registering the objects included in the cluster in the registration database.

6. The information processing apparatus according to claim 5, wherein the update unit updates the registration database in a case where a number of features registered in the second database is greater than a predetermined number.

7. The information processing apparatus according to claim 5, wherein the update unit updates the registration database in a case where a video image captured in a previously-designated time period is acquired.

8. The information processing apparatus according to claim 1, wherein, in a case where a number of features indicating a same object among features registered in the first database is greater than a predetermined number, the control unit deletes a feature having a lower degree of similarity to the feature of a predetermined object from the first database.

9. The information processing apparatus according to claim 1,
wherein the first determination unit detects a feature having a degree of similarity to the feature of the object detected in the video image that is higher than a first threshold and lower than or equal to a second threshold, among the features registered in the registration list, as a candidate object, and detects a feature having a degree of similarity to the feature of the object detected in the video image that is higher than the second threshold, as the predetermined object, and
wherein the control unit registers the feature of the object extracted from the video image or the ID information in the first database or the second database in a case where the candidate object is detected.

10. The information processing apparatus according to claim 1, wherein the at least one processor is further configured to function as an output unit configured to output information to be notified to a user in a case where the target object is detected.

11. A non-transitory storage medium storing a program for causing a computer to execute an information processing method, the information processing method comprising:
performing a first determination to determine whether a feature similar to a feature of an object extracted from a video image is detected in a registration database in which a feature of an object and identification (ID) information for identifying the object are associated with each other;
in a case where it is determined that the feature similar to the feature of the object extracted from the video image is detected in the registration database, add identification information of the object and a detection time of the object to a first database in which identification information of an object and a detection time of the object are associated with each other, and in a case where it is determined that the feature similar to the feature of the object extracted from the video image is not detected in the registration database, add the feature of the object and the detection time of the object to a second database in which a feature of an object and a detection time of the object are associated with each other;
receiving a query for searching for a target object, and
performing, based on whether a feature similar to a feature of the target object contained in the query is detected in the registration database, one or more database used for searching for a detection time of the target object from among the first database and the second database both of which are different from the registration database.

12. An information processing method comprising:

determining whether a feature similar to a feature of an object extracted from a video image is detected in a registration database in which a feature of an object and identification (ID) information for identifying the object are associated with each other;

in a case where it is determined that the feature similar to the feature of the object extracted from the video image is detected in the registration database, add identification information of the object and a detection time of the object to a first database in which identification information of an object and a detection time of the object are associated with each other, and in a case where it is determined that the feature similar to the feature of the object extracted from the video image is not detected in the registration database, add the feature of the object and the detection time of the object to a second database in which a feature of an object and a detection time of the object are associated with each other;

receiving a query for searching for a target object; and determining, based on whether a feature similar to a feature of the target object contained in the query is detected in the registration database, one or more database used for searching for a detection time of the target object from among the first database and the second database both of which are different from the registration database.

13. The information processing apparatus according to claim 10, wherein the output unit is configured to output information to be notified to a user in a case where the feature similar to the feature of the object extracted from the video image is detected.

14. The information processing apparatus according to claim 10, wherein features of the target object are registered in the registration database, the ID information which is a scalar value is registered in the first database, and indexes corresponding to multi-dimensional features are registered by clustering the features registered in the second database.

* * * * *